(12) United States Patent  
Lee

(10) Patent No.: US 8,087,036 B2  
(45) Date of Patent: Dec. 27, 2011

(54) USING AN EVENT MANAGER TO EFFECT A LIBRARY FUNCTION CALL

(75) Inventor: Van H. Lee, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 1145 days.

(21) Appl. No.: 11/835,883

(22) Filed: Aug. 8, 2007

(65) Prior Publication Data

US 2009/0044201 A1    Feb. 12, 2009

(51) Int. Cl.
    G06F 3/00    (2006.01)
(52) U.S. Cl. .................................. 719/328; 719/331
(58) Field of Classification Search .................. 719/328, 719/331
    See application file for complete search history.

(56) References Cited

U.S. PATENT DOCUMENTS

| | | | |
|---|---|---|---|
| 5,404,519 A * | 4/1995 | Denio | 719/328 |
| 5,628,017 A * | 5/1997 | Kimmerly et al. | 717/127 |
| 5,640,319 A * | 6/1997 | Beuning et al. | 700/2 |
| 5,809,235 A | 9/1998 | Sharma et al. | |
| 6,167,448 A | 12/2000 | Hemphill et al. | |
| 6,698,015 B1 * | 2/2004 | Moberg et al. | 717/154 |
| 6,877,160 B2 | 4/2005 | Delatorre et al. | |
| 7,020,561 B1 * | 3/2006 | McLoughlin et al. | 702/19 |
| 7,213,098 B2 * | 5/2007 | Czajkowski | 711/2 |
| 2001/0048448 A1 * | 12/2001 | Raiz et al. | 345/700 |
| 2003/0050983 A1 | 3/2003 | Johnson | |
| 2003/0131135 A1 | 7/2003 | Yun | |

OTHER PUBLICATIONS

Javed I. Khan, Event Model and Application Programming Interface of TCP-Interactive, Feb. 2, 2003.*

Majumder, et al.; An Event-driven Architecture for MPI Libraries; pp. 1-15; Los Alamos National Laboratory.

* cited by examiner

*Primary Examiner* — Lechi Truong
(74) *Attorney, Agent, or Firm* — DeLizio Gilliam, PLLC

(57) ABSTRACT

An event manager can be used to effect a library function call from a caller service processor application to a data processing function in a library. The library is compiled into a callee service processor application, including passing, by the caller service processor application to the event manager through the caller service processor application's API, an event representing the library function call; passing, by the event manager to the callee service processor application, the event representing the library function call; executing by the callee service processor application the library function call, including retrieving return data from the library function call; returning, by the callee service processor application to the event manager, an event representing the return data from the library function call; and returning, by the event manager to the caller service processor application, the event representing the return data from the library function call.

18 Claims, 12 Drawing Sheets

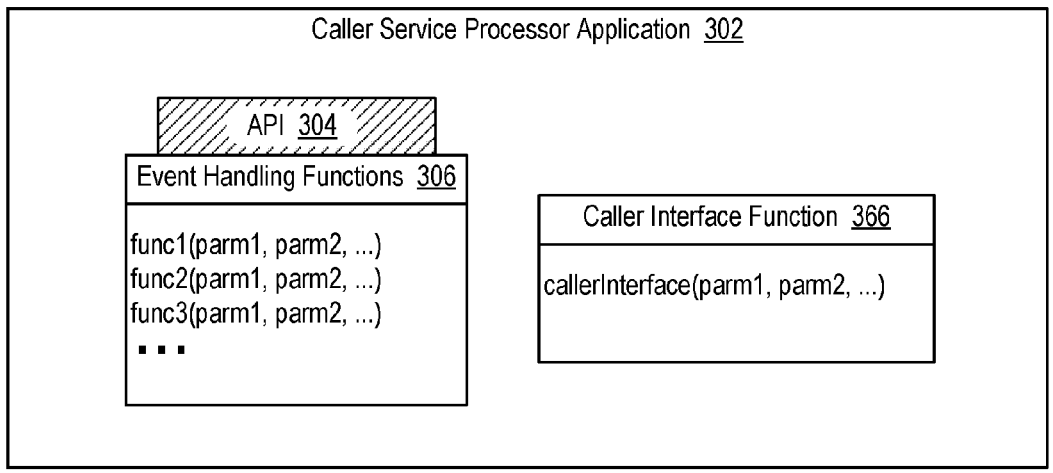
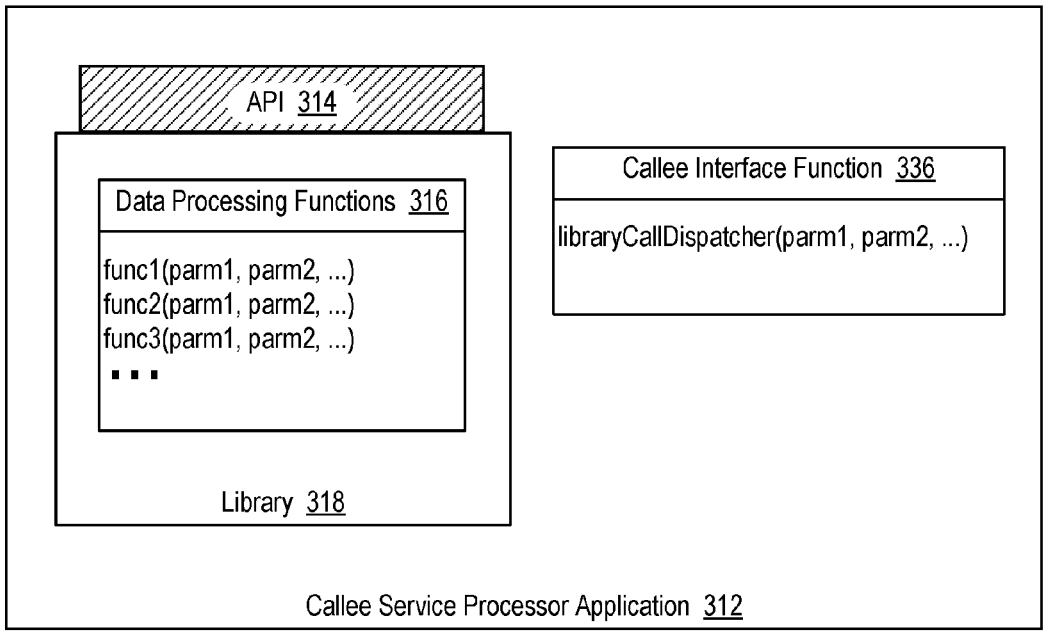
FIG. 7    Library Function Call Components

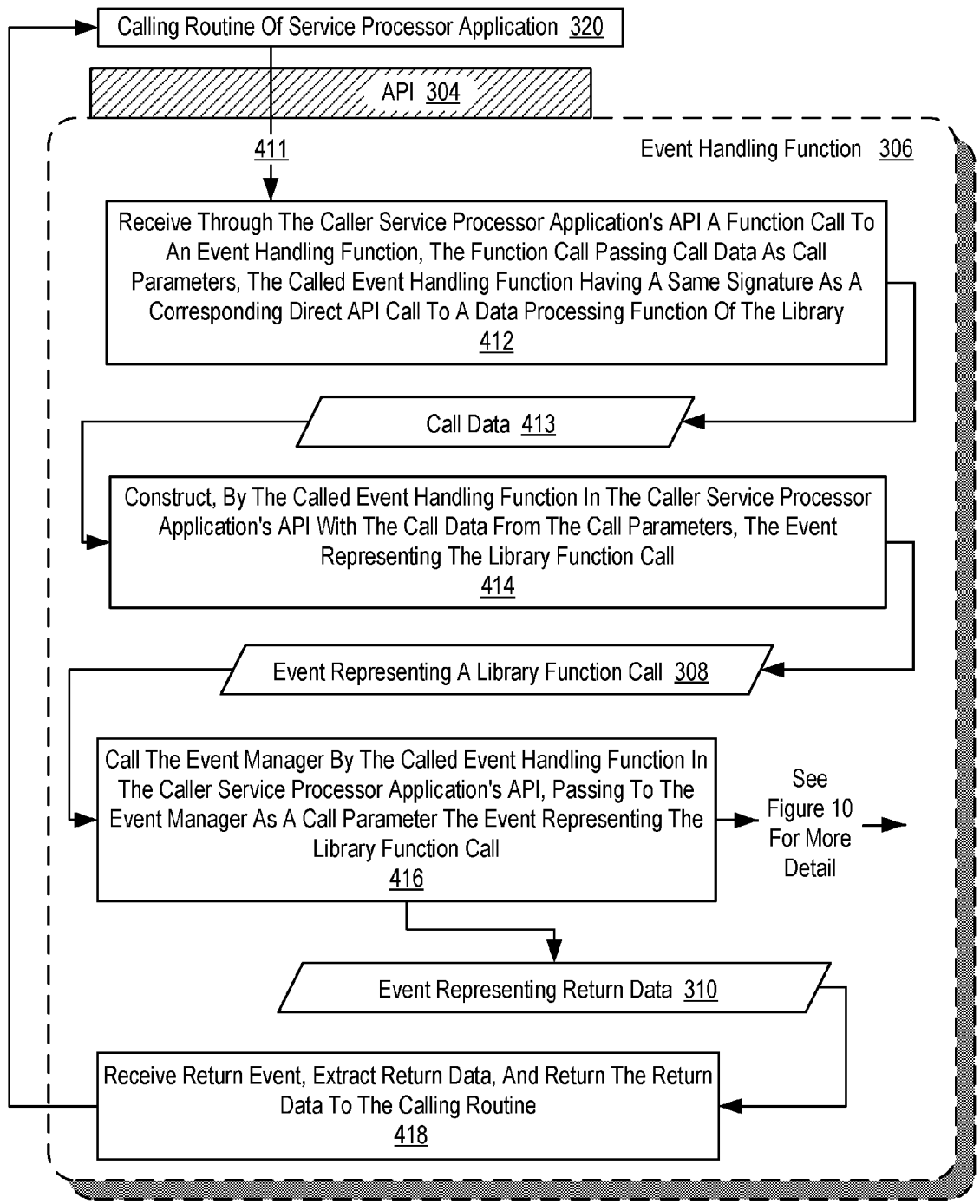
FIG. 9  Operation Of An Event Handling Function Of A Caller Service Processor Application

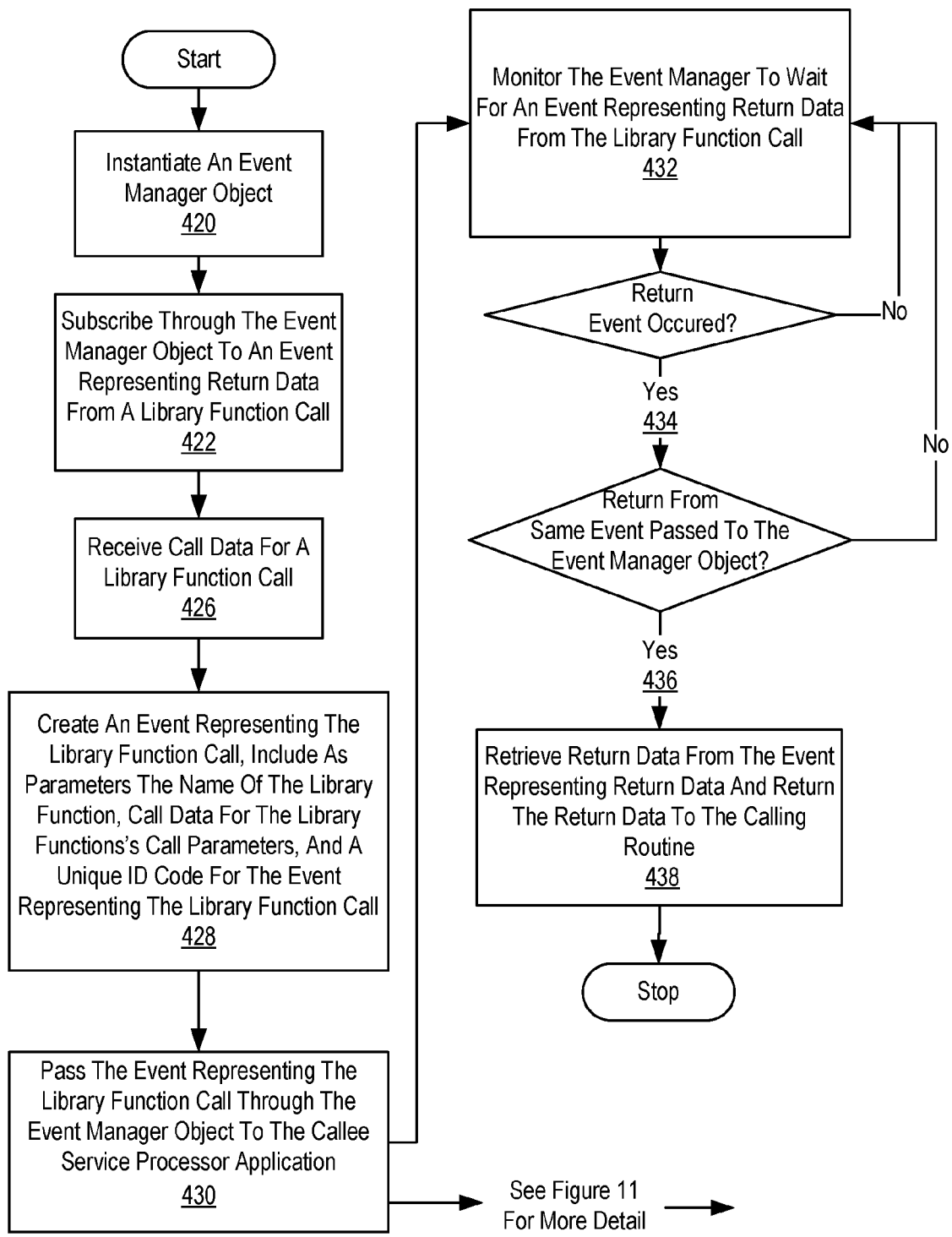
FIG. 10  Operation Of A Caller Interface Function (366)

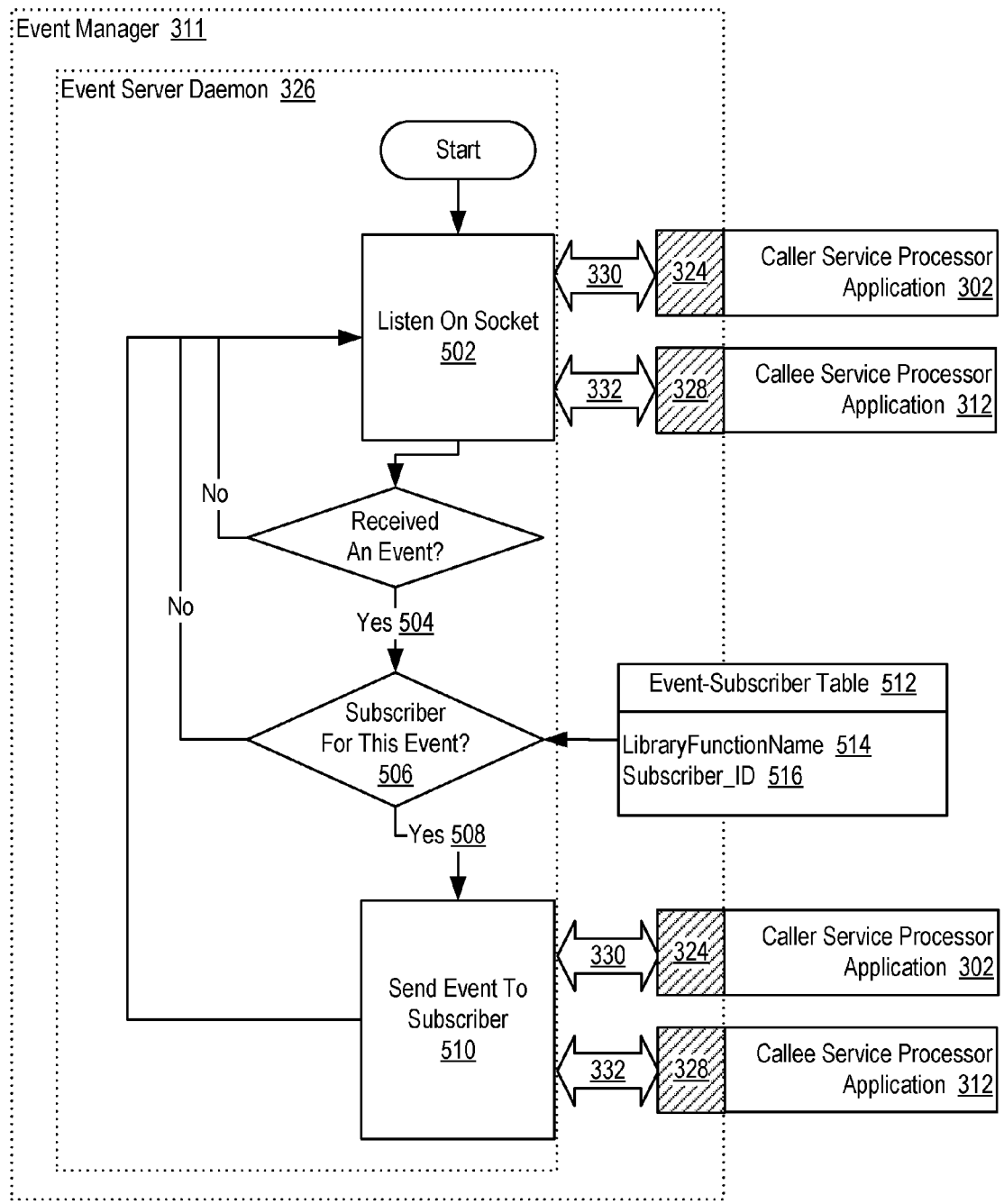
FIG. 11  Operation Of An Event Server Daemon Component Of An Event Manager

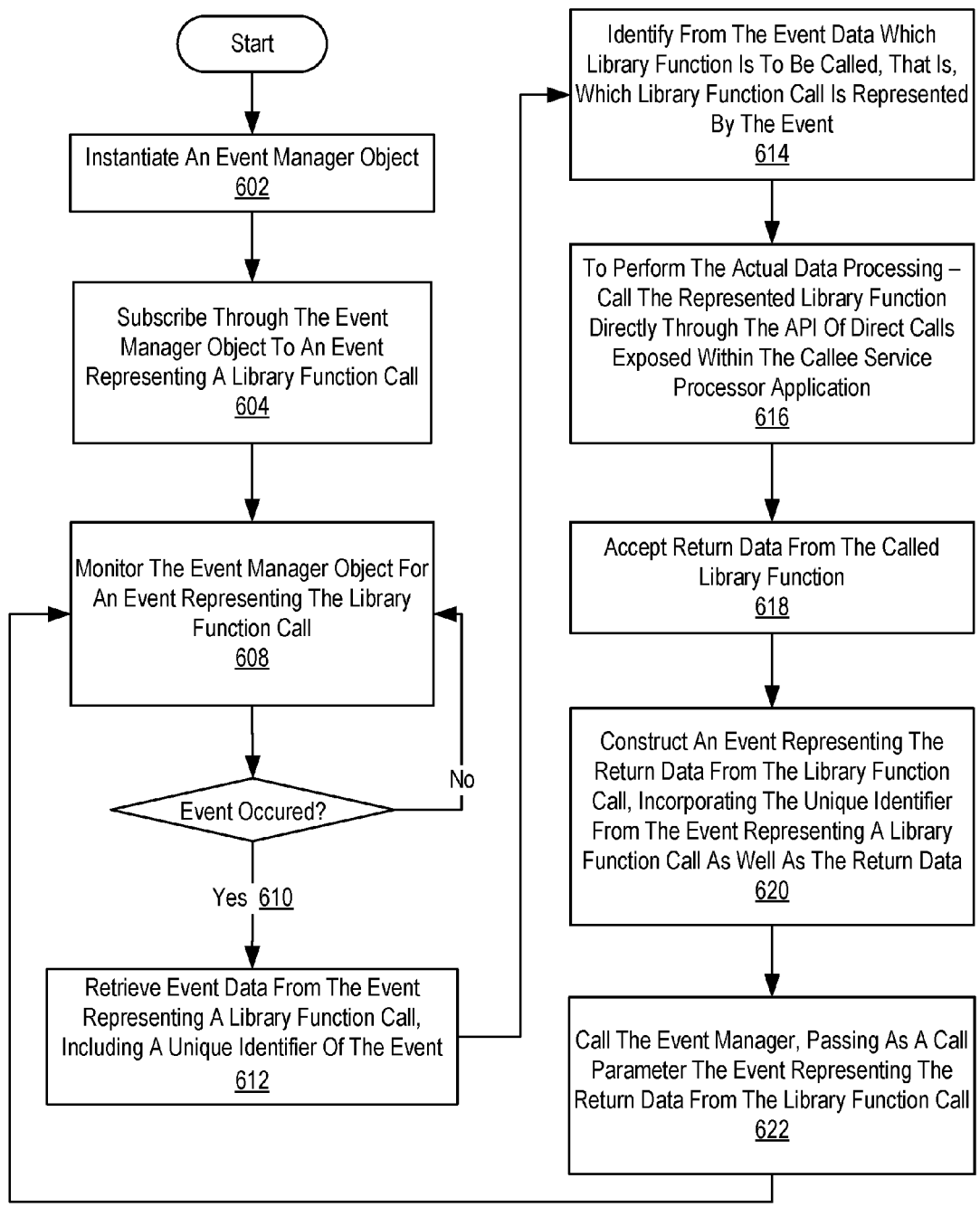
FIG. 12  Operation Of A Library Call Dispatcher

USING AN EVENT MANAGER TO EFFECT A LIBRARY FUNCTION CALL

BACKGROUND OF THE INVENTION

1. Field of the Invention

The field of the invention is data processing, or, more specifically, methods, apparatus, and products for using an event manager to effect a library function call.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in the utilization of services processors. A service processor is a computer processor that is installed in a host computer, in addition to a main processor, to provide to the host computer diagnostics, initialization services, configuration services, run-time error detection, error correction, and the like. A service processor typically has one or more shared libraries of data processing functions provided by various service processor components. These libraries typically use a client/server interprocess communications ('IPC') framework to make available the data processing functions within one component of a service processor to the other components. This IPC framework is effective to export a larger number of data processing functions. However, one component may only need to utilize a quite small number of functions. In such a case, an alternative implementation would be desirable for simplicity and compactness.

SUMMARY OF THE INVENTION

Methods, apparatus, and products are disclosed that use an event manager to effect a library function call from a caller service processor application to a function in a library of data processing functions that carry out particular tasks of data processing, where the library is compiled into a callee service processor application. Embodiments typically function by passing, by the caller service processor application to the event manager through the caller service processor application's API, an event representing the library function call; passing, by the event manager to the callee service processor application, the event representing the library function call; executing by the callee service processor application the library function call, including retrieving return data from the library function call; returning, by the callee service processor application to the event manager, an event representing the return data from the library function call; and returning, by the event manager to the caller service processor application, the event representing the return data from the library function call.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 7 sets forth a block diagram of exemplary library function call components useful in effecting library function calls through an event manager according to embodiments of the present invention.

FIG. 9 sets forth a flow chart illustrating an exemplary method of passing, by the caller service processor application through the caller service processor application's API to the event manager, an event representing a library function call.

FIG. 10 sets forth a flow chart illustrating a further exemplary method of passing, by the caller service processor application through the caller service processor application's API to the event manager, an event representing a library function call.

FIG. 11 sets forth a flow chart illustrating an example method of operation for an event server daemon component of an event manager.

FIG. 12 sets forth a flow chart illustrating an exemplary method of executing by a callee service processor application the represented library function call, including retrieving return data from the library function and returning by the callee service processor application to the event manager an event representing the return data from the library function call.

DETAILED DESCRIPTION OF EXEMPLARY EMBODIMENTS

Figure 1:
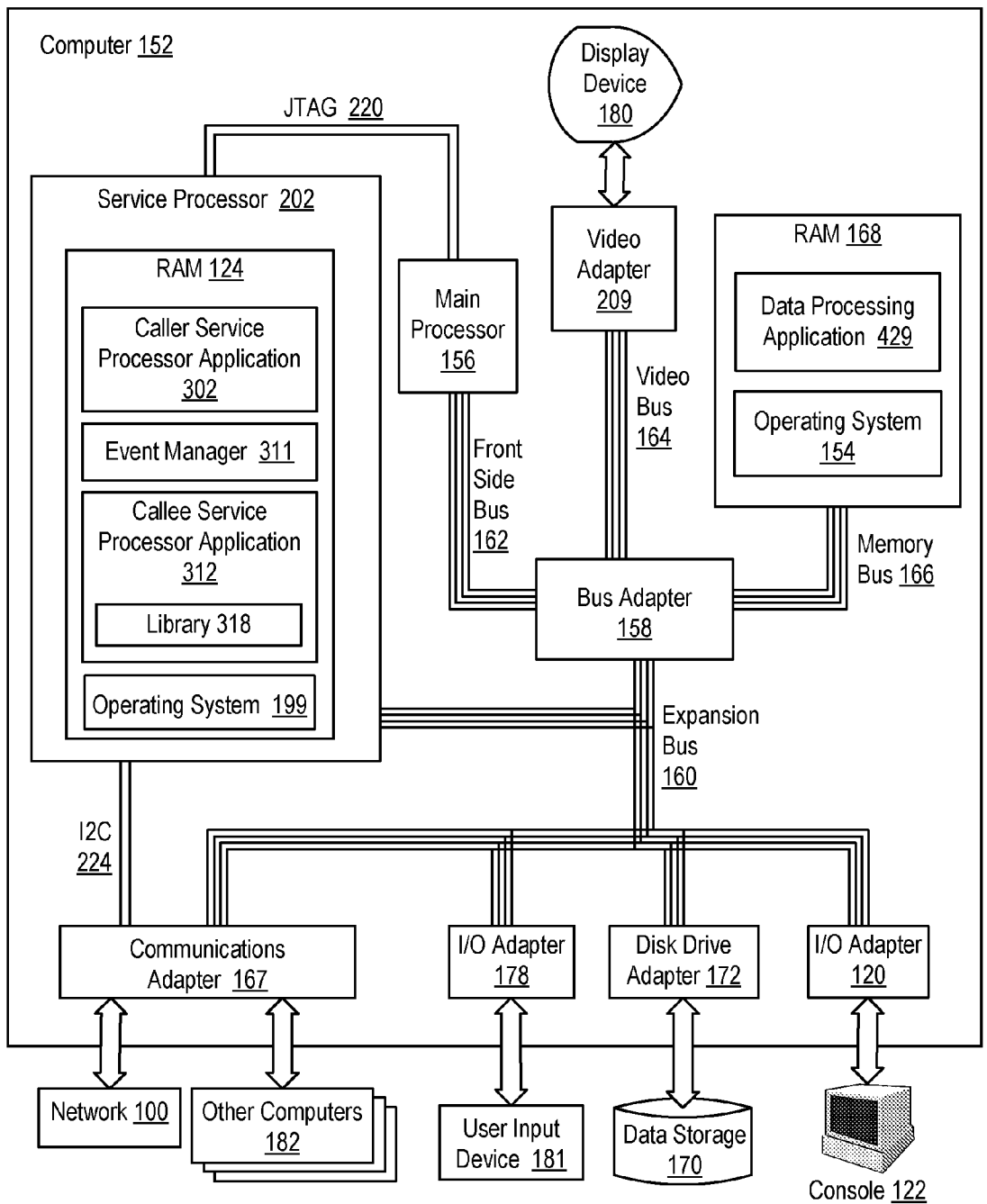
FIG. 1 sets forth a block diagram of automated computing machinery comprising an exemplary computer useful in using an event manager to effect a library function call according to embodiments of the present invention.

Exemplary methods, apparatus, and products for using an event manager to effect a library function call in accordance with the present invention are described with reference to the accompanying drawings, beginning with FIG. 1. FIG. 1 sets forth a block diagram of automated computing machinery comprising an exemplary computer (152) useful in using an event manager to effect a library function call according to embodiments of the present invention. The computer (152) of FIG. 1 includes at least one main computer processor (156) or 'CPU' as well as random access memory (168) ('RAM') which is connected through a high speed memory bus (166) and bus adapter (158) to processor (156) and to other components of the computer (152). The computer (152) of FIG. 1 includes at least one service processor (202) which is also connected through bus adapter (158) to processor (156) and to other components of the computer (152). In this example, the service processor (202) is also connected to components of the computer (152) through a Joint Test Action Group ('JTAG') connection (220) and an inter-integrated circuit ('I2C') connection (224). The main processor (156) is referred to in this specification as a 'main' processor to distinguish it from the service processor (202). The main processor (156) is the processor upon which normal data processing programs are executed, server applications, word processing programs, web sites, spreadsheets, database managers, and so on. The service processor (202) is a computer-within-a-computer; the computer (152) containing the service processor (152) is referred to as a 'host.' In the example of FIG. 1, the host computer (152) is composed of main processor (156), RAM (168), bus adapter (158), expansion bus (160), and so on.

The service processor (202) operates independently of the main processor (156) and includes its own RAM (124) and other components explained in more detail below. The term 'service processor' refers both to the service processor hardware, one or more microprocessors, RAM, flash memory, and so on, as well as the software and firmware of the service processor. The service processor operates generally to provide to the host computer diagnostics, initialization services, configuration services, run-time error detection, and error correction. The service processor (202) controls the hardware of the host computer, provides I/O functionality for management control through a management console (122), monitors and diagnoses the operational state of the host, and so on. Examples of services provided by the service processor (202) for the host computer (152) typically include 'Power On Self Test' and similar host diagnostics, environmental monitoring and automated domain-shutdown in the event of an out-of-bounds condition, such as a CPU getting too hot, assigning multiple paths to I/O devices for increased availability, monitoring and displaying host environmental statistics, such as the temperatures, currents, and voltages present on system boards, monitoring and controlling power flow to the host components such as system boards and control boards, and logging, notification, and response for various events in the host computer.

The service processor (202) is connected through expansion bus (160) and I/O adapter (120) to management console (122). The management console (122) is operated by an operator as a specific terminal for issuing commands to the service processor (202) and for viewing status reports and event notifications from the service processor. Of course the service processor also may send status reports and event notifications to printers, disk files, or other I/O destinations.

Stored in the host computer's RAM (168) is a data processing application (429), a module of computer program instructions for carrying out user-level data processing. Examples of data processing applications include server applications, word processing programs, web sites, spreadsheets, database managers, and so on. Also stored in host RAM (168) is an operating system (154). Operating systems useful in host computers that support using an event manager to effect a library function call according to embodiments of the present invention include UNIX™, Linux™, Microsoft XP™, AIX™, IBM's i5/OS™, and others as will occur to those of skill in the art. The application (429) and the host's operating system (154) in the example of FIG. 1 are shown in RAM (168), but many components of such software typically are stored in non-volatile memory also, such as, for example, in Flash memory or on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for using an event manager to effect a library function call according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that support using an event manager to effect a library function call according to embodiments of the present invention include modems for wired dial-up communications, Ethernet (IEEE 802.3) adapters for wired data communications network communications, and 802.11 adapters for wireless data communications network communications.

In the example of FIG. 1, disposed in the service processor's RAM (124) are a caller service processor application (302), an event manager (311), a callee service processor application (312), a library (318) of data processing functions, and an operating system (199) for the service processor. In this example, the caller service processor application (302), the event manager (311), the callee service processor application (312), the library (318) of data processing functions, and the operating system (199) for the service processor are all shown disposed in the service processor's RAM (124). Readers will recognize, however, that components of such software also may be stored in non-volatile memory, such as, for example, in Flash memory (218 on FIG. 2) or on a disk drive (170).

The caller service processor application (302), the callee service processor application (312), and the event manager (311) are modules of computer program instructions that execute on the service processor (202). The event manager is an object-oriented module that provides an interface through which service processor applications can subscribe to and monitor events on the service processor as well as events occurring on the host computer. The library (318) contains data processing functions that carry out particular tasks of data processing. The library is compiled into the callee service processor application, exposing within the callee service processor application an application programming interface ('API') of direct calls to computer software functions of the library. The direct calls have characteristic signatures, and the signatures include call parameters, such as, for example:

func1(parm1, parm2, . . . ), where "func1(parm1, parm2, . . . )" is a signature for call to a function named "func1" with call parameters named "parm1," "parm2," and so on.

Compiled into the callee service processor application, the data processing functions of the library cannot be called directly from service processor applications other than the callee service processor application. The caller service processor application is therefore improved according to embodiments of the present application to include an API for one or more event handling functions having signatures of corresponding direct calls to data processing functions in the library's API. The caller service processor application's API calls, however, are directed to event handling functions that effect event handling only.

Given this framework as illustrated in FIG. 1, which is explained in more detail below, the service processor (202) in the example of FIG. 1 operates generally to use the event manager (311) to effect a library function call from the caller service processor application (302) to a function in the library (318) of data processing functions in the callee service processor application (312) by passing, by the caller service processor application (302) to the event manager (311) through the caller service processor application's API, an event representing the library function call; passing, by the event manager (311) to the callee service processor application (312), the event representing the library function call; executing by the callee service processor application (312) the library function call, including retrieving return data from the library function call; returning, by the callee service processor application (312) to the event manager (311), an event representing the return data from the library function call; and returning, by the event manager (311) to the caller service processor application (302), the event representing the return data from the library function call.

Figure 2:
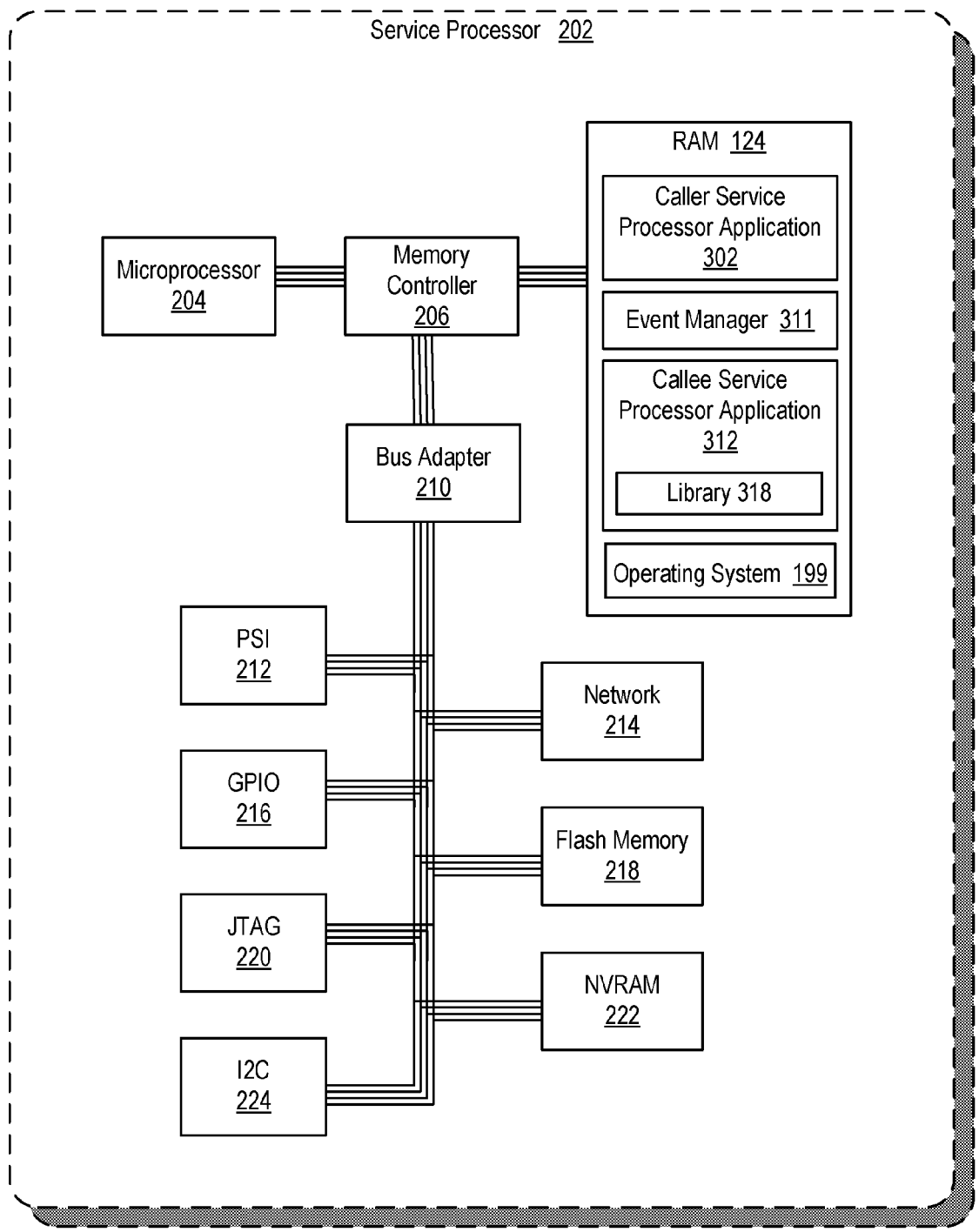
FIG. 2 sets forth a functional block diagram illustrating an exemplary service processor useful in using an event manager to effect a library function call in accordance with the present invention.

For further explanation, FIG. 2 sets forth a functional block diagram illustrating an exemplary service processor useful in using an event manager to effect a library function call in accordance with the present invention, including hardware and software components of the service processor. The example service processor of FIG. 2 includes a microprocessor (204) for executing service processor applications, an operating system for the service processor, as well as other service processor system-level software. An example of a microprocessor that can be adapted for use in such a service processor is the IBM PowerPC 405™. The example service processor of FIG. 2 also includes a memory controller (206) and embedded RAM (124). Disposed in the service processor's RAM (124) are a caller service processor application (302), an event manager (311), a callee service processor application (312), a library (318) of data processing functions, and an operating system (199) for the service processor.

The memory controller (206) and the RAM (124) are shown here as separate devices, but they may also be implemented as embedded devices within the microprocessor (204). Similarly, bus adapter (210) may be implemented as a separate device or embedded in the microprocessor (205). The service processor also includes a Processor Service Interface ('PSI') (212) which is a port for direct communications with a main processor, as well as a general purpose I/O port (216), a Joint Test Action Group ('JTAG') port (220), an inter-integrated circuit ('I2C') port (224), a data communications port (214) for network connections, Flash memory (218), and non-volatile RAM (222).

Figure 3:
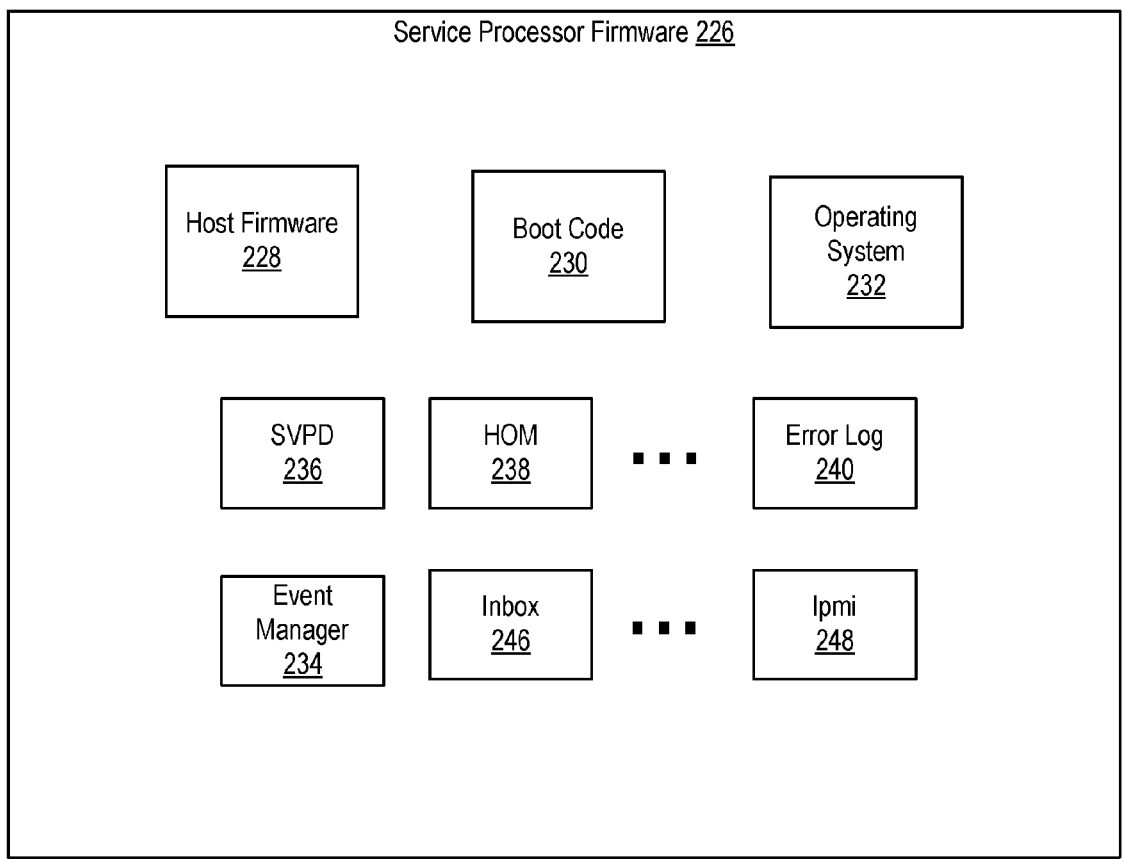
FIG. 3 sets forth a block diagram illustrating exemplary firmware of a service processor useful for using an event manager to effect a library function call in accordance with the present invention.

For further explanation, FIG. 3 sets forth a block diagram illustrating exemplary firmware of a service processor useful for using an event manager to effect a library function call in accordance with the present invention. Host computer firmware (228) is included here to represent service processor access to the host firmware for purposes of Power On Self Test, basic I/O access, event detection and management, and so on. The example service processor firmware in this example also includes boot code (230) and an embedded operating system (232) to run on the service processor's microprocessor, System Vital Product Data (236), a Hardware Object Model (238) that abstracts host hardware as objects, an error log (240), an event manager (234), a mailbox for messages from a main processor delivered through a PSI (212 on FIG. 2), and an Intelligent Platform Management Interface ('IPMI') module (248). Operating systems useful in service processors that support using an event manager to effect a library function call according to embodiments of the present invention include UNIX™, Linux™, Microsoft XP™, AIX™, IBM's i5/OS™, and others as will occur to those of skill in the art. The IPMI module (248) implements a standard specification of interfaces to computer hardware and firmware for monitoring host health and managing a host. IPMI operates independently of the host operating system and allows service processors and system administrators to manage a host remotely even in the absence of the host operating system, or even if the monitored host is not powered on. IPMI can also function when the host operating system has started and offers enhanced features when used with system management software. Some IPMI implementations can send out alerts via a direct serial connection, a local area network ('LAN') or a serial over LAN ('SOL') connection to a remote client. System administrators can then use IPMI messaging to query host status, to review hardware logs, or to issue other requests from a remote management console through the same connections. The IPMI standard also defines an alerting mechanism for the service processor to send a simple network management protocol ('SNMP') platform event trap ('PET').

Figure 4:
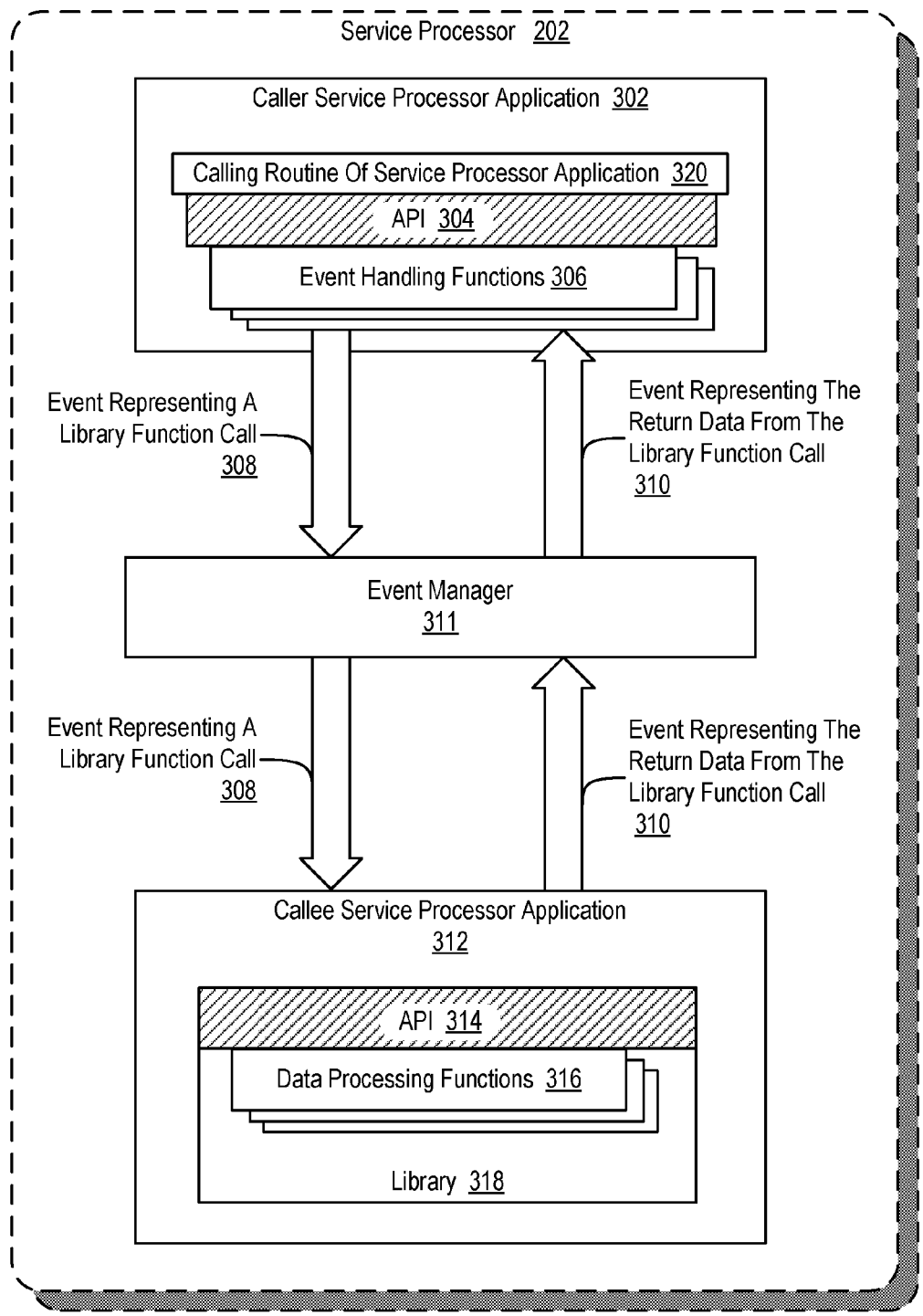
FIG. 4 sets forth a functional block diagram of an exemplary service processor configured to use an event manager to effect a library function call according to embodiments of the present invention.

For further explanation, FIG. 4 sets forth a functional block diagram of an exemplary service processor (202) configured to use an event manager (311) to effect a library function call according to embodiments of the present invention. In the example of FIG. 4, the service processor runs a caller service processor application (302), an event manager (311), a callee service processor application (312). The caller service processor application(302), the callee service processor application (312), and the event manager (311) are modules of computer program instructions that execute on the service processor (202). The event manager is an object-oriented module that provides an interface through which service processor applications can subscribe to and monitor events on the service processor as well as events occurring on the host computer. The callee service processor application (312) includes a library (318) of data processing functions (316)

that carry out particular tasks of data processing. The library is compiled into the callee service processor application (312), exposing within the callee service processor application an application programming interface ('API') (314) of direct calls to computer software functions of the library. The direct calls have characteristic signatures, and the signatures include call parameters, such as, for example:

func1(parm1, parm2, . . . )

where "func1(parm1, parm2, . . . )" is a signature for call to a function named "func1" with call parameters named "parm1," "parm2," and so on.

Compiled into the callee service processor application, the data processing functions (316) of the library (318) cannot be called directly from service processor applications other than the callee service processor application (312). That is, neither the caller service processor application (302) nor software routines within the caller service processor application can directly call the data processing functions (316) of the library (318). The caller service processor application (302) is therefore improved according to embodiments of the present application to include an API (304) for one or more event handling functions (306) having signatures of corresponding direct calls to data processing functions in the library's API. The API (304) in the caller service processor application (302) may not include functions corresponding to all the data processing functions (316) of the library (318) because the caller service processor application may not need access to all of the data processing functions (316) of the library (318). So the caller service processor application's API (304) therefore may implement only a subset of the call signatures available in the API (314) of the callee service processor application (312).

The caller service processor application's API calls, however, are directed to event handling functions that effect event handling only. Because the call signatures are the same in both APIs, the fact that an event handler intervenes in a call is transparent to the caller service processor application. A calling routine (320) in the caller service processor application (302) effects an (indirect) call to a data processing function (316) in the library (318) by issuing exactly the same function call as would be use from inside the callee service processor application, func1(parm1, parm2, . . . ), func2(parm1, parm2, . . . ), and so on. When such a call is issued in the caller service processor application (302), however, the call is directed to an event handling function that marshals call parameters into an event and passes the event to the event handler. That is, the call is directed to an event handling function that uses an event handler to pass the call along in the form of an event to the callee service processor application (312) where the call is eventually implemented as a direct call through the API (314) to its corresponding data processing function (316).

Given this framework as illustrated in FIG. 4, the service processor (202) in the example of FIG. 4 operates generally to use the event manager (311) to effect a library function call from the caller service processor application (302) to a function in the library (318) of data processing functions in the callee service processor application (312) by passing, by the caller service processor application (302) to the event manager (311) through the caller service processor application's API (304), an event (308) representing the library function call; passing, by the event manager (311) to the callee service processor application (312), the event (308) representing the library function call; executing by the callee service processor application (312) the library function call, including retrieving return data from the library function call; returning, by the callee service processor application (312) to the event manager (311), an event (310) representing the return data from the library function call; and returning, by the event manager (311) to the caller service processor application (302), the event (310) representing the return data from the library function call. It is the responsibility of the event handling function (306) to retrieve the return data from the event (310) representing the return data and return the return data to the calling routine (320) in the caller service processor application (302).

Figure 5:
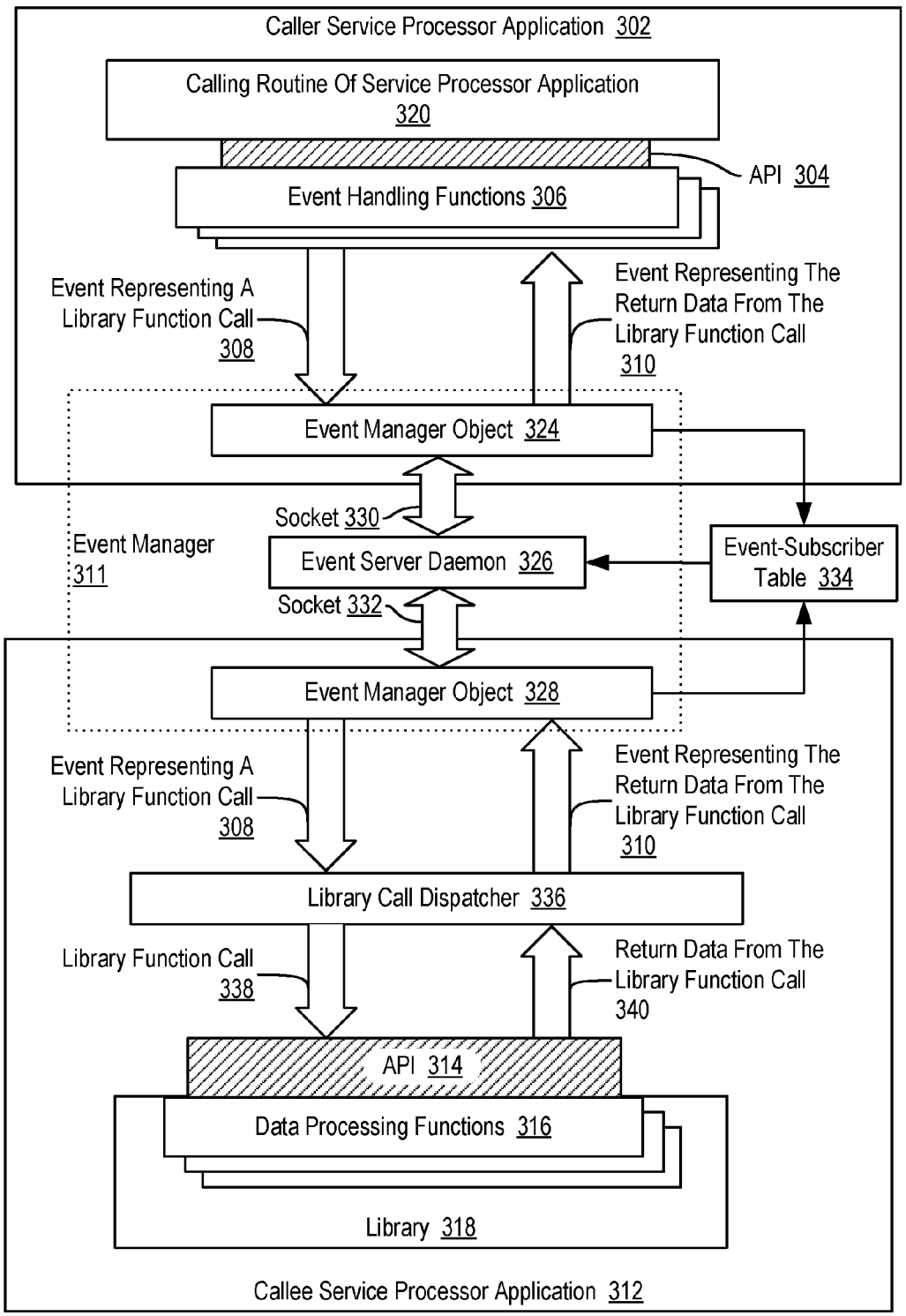
FIG. 5 sets forth a functional block diagram of a further exemplary service processor configured to use an event manager to effect a library function call according to embodiments of the present invention.

For further explanation, FIG. 5 sets forth a functional block diagram of a further exemplary service processor (202) configured to use an event manager (311) to effect a library function call according to embodiments of the present invention. In the example of FIG. 5, the service processor runs a caller service processor application (302), an event manager (311), a callee service processor application (312). The caller service processor application (302), the callee service processor application (312), and the event manager (311) are modules of computer program instructions that execute on the service processor (202). The event manager is an object-oriented module that provides an interface through which service processor applications can subscribe to and monitor events on the service processor as well as events occurring on the host computer. The callee service processor application (312) includes a library (318) of data processing functions (316) that carry out particular tasks of data processing. The library is compiled into the callee service processor application (312), exposing within the callee service processor application an application programming interface ('API') (314) of direct calls to computer software functions of the library. The direct calls have characteristic signatures, and the signatures include call parameters, such as, for example:

func1(parm1, parm2, . . . ), where "func1(parm1, parm2, . . . )" is a signature for call to a function named "func1" with call parameters named "parm1," "parm2," and so on.

Compiled into the callee service processor application, the data processing functions (316) of the library (318) cannot be called directly from service processor applications other than the callee service processor application (312). That is, neither the caller service processor application (302) nor software routines within the caller service processor application can directly call the data processing functions (316) of the library (318). The caller service processor application (302) is therefore improved according to embodiments of the present application to include an API (304) for one or more event handling functions (306) having signatures of corresponding direct calls to data processing functions in the library's API. The API (304) in the caller service processor application (302) may not include functions corresponding to all the data processing functions (316) of the library (318) because the caller service processor application may not need access to all of the data processing functions (316) of the library (318). So the caller service processor application's API (304) therefore may implement only a subset of the call signatures available in the API (314) of the callee service processor application (312).

The caller service processor application's API calls, however, are directed to event handling functions that effect event handling only. Because the call signatures are the same in both APIs, the fact that an event handler intervenes in a call is transparent to the caller service processor application. A calling routine (320) in the caller service processor application (302) effects an (indirect) call to a data processing function (316) in the library (318) by issuing exactly the same function call as would be use from inside the callee service processor application, func1(parm1, parm2, . . . ), func2(parm1, parm2, . . . ), and so on. When such a call is issued in the caller service processor application (302), however, the call is directed to an event handling function (306) that marshals call parameters into an event (308) representing a library function call and passes the event to the event handler (311). That is, the call is directed to an event handling function that uses an event handler to pass the call along in the form of an event to the callee service processor application (312) where the call is eventually implemented as a direct call through the API (314) to its corresponding data processing function (316).

In the example of FIG. 5, the event manager (311) is implemented with two event manager objects (324, 328) and an event server daemon (326), with data communications sockets (330, 332) implementing inter-process communications ('IPC') between the daemon (326) and the event manager objects (324, 328). The event handling function (306) instantiates an event manager object (324) of an event manager class and calls member methods in the event manager object (324) to pass to the event manager an event (308) representing a library function call and to subscribe to an event (310) representing the return data from the library function call. Similarly in the callee service processor application (312), a separate thread of execution called in this example a library call dispatcher (336) instantiates an event manager object (328) and calls member methods in the event manager object (328) to subscribe to an event (308) representing a library function and to pass back to the event manager object (328) an event (310) representing return data from the library function call. The event manager objects (324, 328) use the IPC sockets (330, 332) to pass events representing library function calls (308) and events representing return data from library function calls (310) back and forth through the event server daemon (326) which operates as a separate thread of execution.

Given this framework as illustrated in FIG. 5, the service processor (202) in the example of FIG. 5 operates generally to use the event manager (311) to effect a library function call from the caller service processor application (302) to a data processing function (316) in the library (318) of data processing functions in the callee service processor application (312) by passing, by the caller service processor application (302) to the event manager (311) through the caller service processor application's API (304), an event (308) representing the library function call. In this example, the pass to the event manager is a passing of the event representing a library function call to an event manager object (324) by a call to a member method of the event manager object (324), as, for example, eventManager.signal(libraryFunctionName, event_ID, parm1, parm2, . . . ), where signal( ) is a member method of the event manager object (324) that receives events and passes the events along through the IPC socket (330) to the event server daemon (326). LibraryFunctionName is the name of the data processing function (316) to be called in the library (318). Event_ID is a unique identifier for a particular event representing a particular library function call. Parm1, parm2, . . . represent the call parameters for the library function call.

The event manager (311) passes to the callee service processor application (312), the event (308) representing the library function call. In this example, passing the event (308) to the callee service processor application (312) is carried out by the event server daemon's sending the event representing a library function call through IPC socket (332) to event manager object (328). The library call dispatcher (336) has subscribed to the event representing a library function call with a call to a member method of the event manager object (328), such as, for example:

eventManager.subscribe(libraryFunctionName, subscriber_ID), where subscribe( ) is the name of a member method of the event manager object (328) that registers subscriptions to events in an event-subscriber table (334). Upon receiving the event (308) representing a library function call through the IPC socket (330), the event server daemon (326) checks the event-subscriber table (334) to determine which processes are subscribers to the event, discovers that the callee service processor application (312) is registered as a subscriber, and then passes the event (308) along through an IPC socket (332) to the callee service processor application through event manager object (328) and the library call dispatcher (336).

The callee service processor application (312) executes the library function call, including retrieving return data from the library function call, by the library call dispatcher (336). The library call dispatcher (336) subscribes through the event manager object (328) in the callee service processor application (312) to the event (308) representing a library function call and issues a library function call (338) to a corresponding data processing function (316) in the library (318). The library call dispatcher (336) calls (338) the data processing function represented by the event (308) representing a library function call. The library issues the library function call through the API (314) exposed by the library (318) that is compiled into the callee service processor application (312).

The callee service processor application (312) returns to the event manager (311), an event (310) representing return data from the library function call, again, by the library call dispatcher (336). The library call dispatcher (336) accepts the return data (340) from the library function call (338), constructs an event (310) representing the return data from the library function call, and passes back to the event manager object (328) the event (310) representing return data from the library function call. The library call dispatcher (336) passes the event representing return data to the event manager object (328) by a call, such as, for example:

eventManager.signal(returnData, event_ID, parm1, parm2, . . . ), where signal( ) is a member method of the event manager object (328) that receives events and passes the events along through the IPC socket (332) to the event server daemon (326). The first call parameter for signal( ), "returnData," identifies this event as an event representing return data from a library function call, and the "event_ID" call parameter is set by the library call dispatcher to the same value as the event_ID from the corresponding event representing a library function call. The event manager object (324) in the caller service processor application (302) may be waiting for responses from several library function calls, each represented by a separate event with a separate unique identifier. That value in the event_ID parameter advises the event manager object (324) in the caller service processor application (302) how to match an event (310) representing return data from a library function call with its corresponding event (308) representing the library function call—so that the event manager object (324) in the caller service processor application (302) knows to which event handling function (306) the return data is to be returned.

The event manager (311) returns to the caller service processor application (302) the event (310) representing the return data from the library function call. The event manager object (328) returns the event (310) representing the return data through IPC socket (332) to the event server daemon (326). The event server daemon (326) observes from the event-subscriber table (334) that event manager object (324) has registered caller service processor application (302) as a subscriber for this event (310), and returns the event (310) through IPC socket (330) to event manager object (324) in the caller service processor application (302) which in turn passes the event (310) along to the proper event handling function (306) effectively identified by the unique event identifier represented in the event_ID parameter described above. It is the responsibility of the event handling function (306) to retrieve the return data from the event (310) representing the return data and return the return data to the calling routine (320) in the caller service processor application (302).

Figure 6:
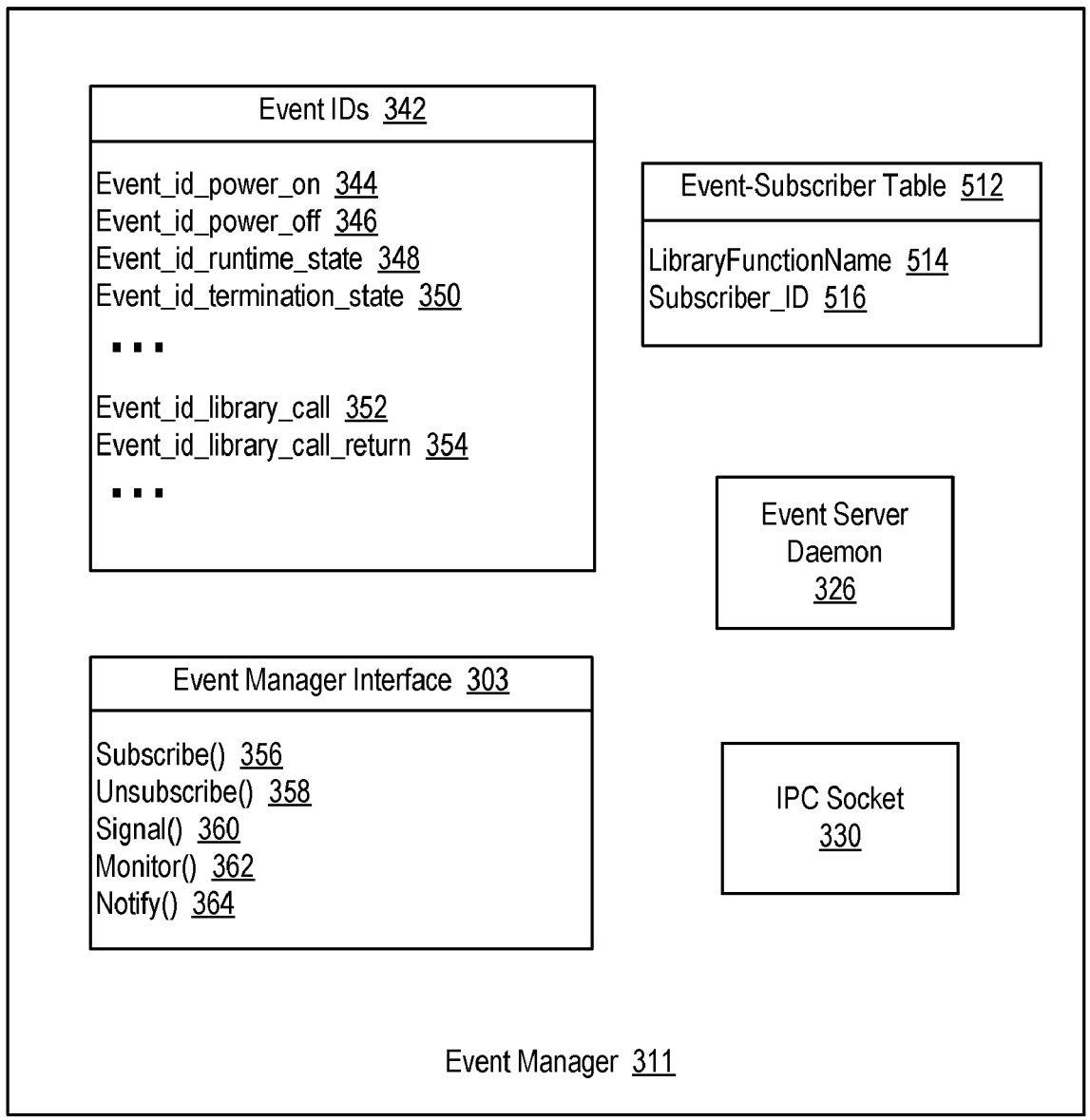
FIG. 6 sets forth a block diagram of an exemplary event manager useful for effecting a library function call according to embodiments of the present invention.

For further explanation, FIG. 6 sets forth a block diagram of an exemplary event manager (311) useful for effecting a library function call according to embodiments of the present invention. The example event manager of FIG. 6 includes a set of event identifiers (342) that include events for power on (344), power off (346), runtime state (348), and termination state (350)—all events of types that would typically be found in IPMI operations—only four examples where naturally there could be dozens or hundreds of different event types. In addition, however, this event set (342) has been improved according to embodiments of the present invention to include an event named "Event_id_library_call" to represent library function calls and an event named "Event_id_library_call_return" to represent return data from library calls.

The example event manager of FIG. 6 includes an event manager interface (303), a specification of the member methods exposed for use by caller service processor applications, callee service processor applications, event handling functions, library call dispatchers, and the like, in passing events through the event manager, that is, through event manager objects instantiated from an event manager class that implements the interface (303). The event manager interface (303) includes a subscribe( ) method (356), an unsubscribe( ) method (358), a signal( ) method (360), a monitor( ) method (362), and a notify method (364). The subscribe( ) method (356) registers subscriptions to event in an event-subscriber table, notifying the event server daemon that a particular subscriber process, a library call dispatcher or an event handling function has registered as a subscriber to an event, an event representing a library function call or an event representing return data from a library function call. The subscriptions are represented by records in the event-subscriber table (334), each of which contains a LibraryFunctionName field (514) that identifies a particular data processing function in a library and a subscriber_ID field (516) that identifies a process or thread of execution that has registered as a subscriber to events representing library function calls to the data processing function identified in the LibraryFunctionName field (514).

The unsubscribe( ) method (358) causes subscription records to be deleted from the event-subscriber table (334). The signal( ) method (360) passes an event to an event manager, that is, to an event management object instantiated by a caller service processor application or a callee service processor application, by an event handling function of a caller service processor application or by a library call dispatcher of a callee service processor application. The monitor( ) method (362) implements a blocking call that allows a registered subscriber to wait to receive an event to which the subscriber has subscribed. The notify method (364) is used internally by the event manager upon receipt of an event to make the event available to a waiting monitor( ) method and allow the monitor( ) method to return an event to a subscriber.

The example event manager (311) of FIG. 6 also includes an event server daemon (326), a module of computer program instructions that operates in a separate thread of execution to facilitate communications of events back and forth among caller service processor functions and callee service processor functions. The example event manager (311) of FIG. 6 also includes and IPC socket (330), instances of which are used by the event server daemon (326) to implement communications of events back and forth among caller service processor functions and callee service processor functions.

For further explanation, FIG. 7 sets forth a block diagram of exemplary library function call components useful in effecting library function calls through an event manager according to embodiments of the present invention. The example library function call components of FIG. 7 include a library (318) of data processing functions (316) compiled into a callee service processor application (312) so that all of the data processing functions of the library are available within the callee data processing application for direct access through an API (314) from calling routines within the callee service processor application. The data processing functions (316) have exemplary call signatures func1(parm1, parm2, ... ), func2(parm1, parm2, ... ), and so on. The callee service processor application (312) in this example also includes a callee interface function (336) which is a library call dispatcher, a module of computer program instructions that executes in a separate thread and provides an interface between an event manager and the data processing functions for using the event manager to effect library function calls according to embodiments of the present invention.

The example library function call components of FIG. 7 include, in a caller service processor application (302), event handling functions (306) each of which has a signature of a corresponding data processing function (316) in the library (318) of the callee service processor application (312). From the point of view of the caller service processor application (302), therefore, a call to an event handling function looks exactly the same as a direct call to a corresponding data processing function (316), func1(parm1, parm2, ... ), func2 (parm1, parm2, ... ), and so on. There are no direct calls, however, from caller service processor application (302) to data processing routines (316) in the library (318) of the callee service processor application (312) because the library is compiled into the callee service processor application and is not compiled into the caller service processor application. Instead of direct calls, each event handling function (306) operates to construct an event representing a library function call to a data processing function (316) in the library (318) of the callee service processor application (312) and use the event so constructed to effect an indirect call, through an event manager, to its corresponding data processing function, that is, a data processing function having the same signature, in the library of the callee service processor application.

The event handling functions in this example have available to them in the caller service processor application an additional, optional caller interface function (366) named callerInterface( ) where the low-level work of actual communications with an event manager, being the same for each event handling function, are offloaded from the event handling functions, thereby reducing duplication of code across multiple event handling functions and leaving the event handling functions themselves lean and elegant.

Figure 8:
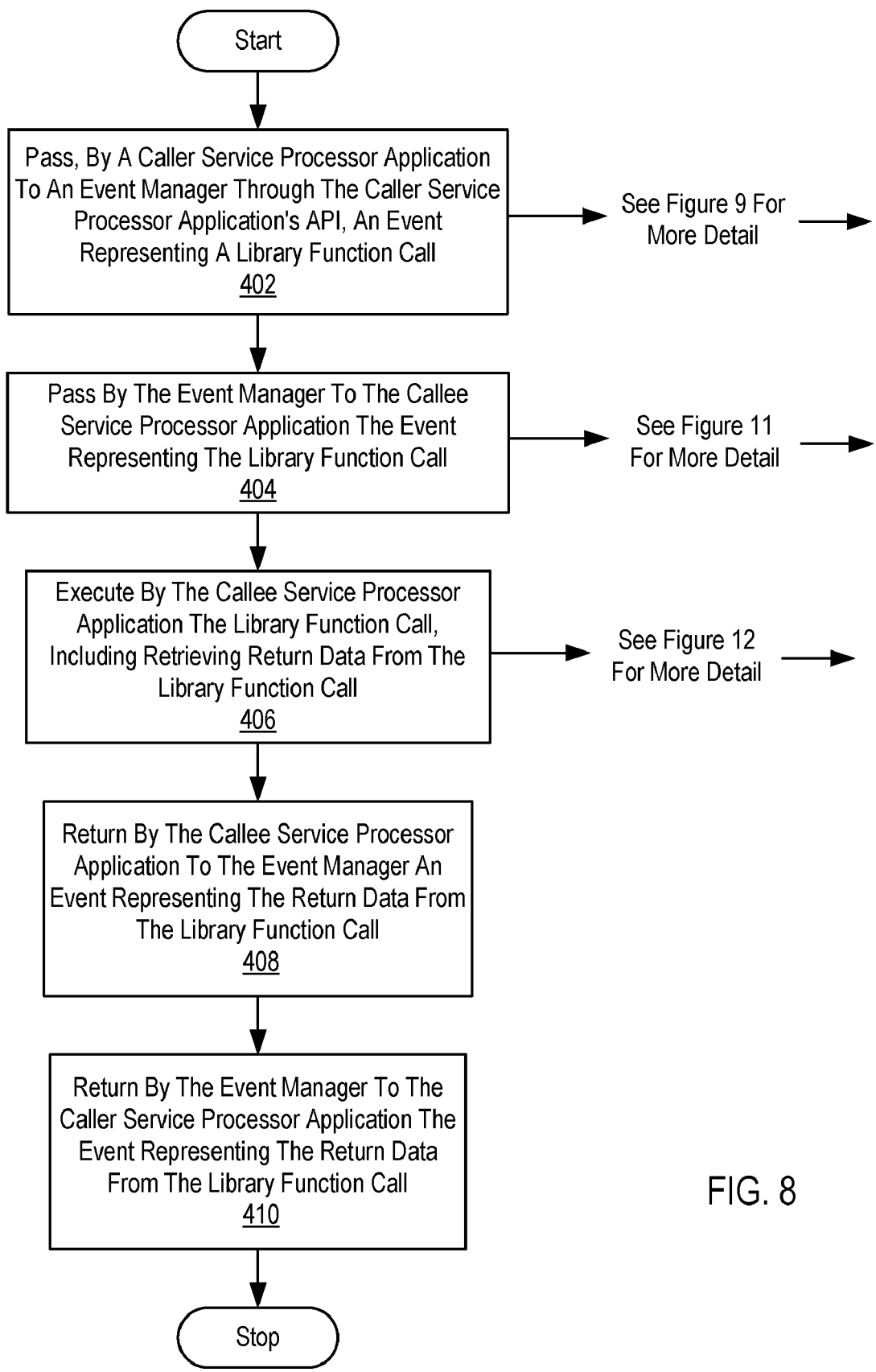
FIG. 8 sets forth a flow chart illustrating an exemplary method for using an event manager to effect a library function call according to embodiments of the present invention.

For further explanation, FIG. 8 sets forth a flow chart illustrating an exemplary method for using an event manager to effect a library function call according to embodiments of the present invention. The method of FIG. 8 uses an event manager to effect a library function call from a caller service processor application to a function in a library of data processing functions that carry out particular tasks of data processing, where the library is compiled into a callee service processor application. The caller service processor application, the callee service processor application, and the event manager are modules of computer program instructions that execute on a service processor of a computer, and the library exposes within the callee service processor application an API of direct calls to computer software functions of the library. The direct calls have characteristic signatures, and the signatures include call parameters. The caller service processor application includes an API for one or more event handling functions having signatures of corresponding direct calls to data processing functions in the library's API. The caller service processor application's API calls are directed to event handling functions that effect event handling only.

The method of FIG. 8 includes passing (402), by the caller service processor application to the event manager through the caller service processor application's API, an event representing the library function call. Passing an event representing the library function call to the event manager through the caller service processor application's API can be carried out, for example, by an event handling function of the caller service processor application as described in more detail both above in this specification and below with reference to FIG. 9.

The method of FIG. 8 also includes passing (404), by the event manager to the callee service processor application, the event representing the library function call. The method of FIG. 8 also includes returning (410), by the event manager to the caller service processor application, the event representing the return data from the library function call. Passing the event representing the library function call by the event manager to the callee service processor application as well as returning the event representing the return data from the library function call by the event manager to the caller service processor application both can be carried out, for example, by use of interfaces provided through event manager objects and an event server daemon as described in more detail both above in this specification and below with reference to FIG. 11.

The method of FIG. 8 also includes executing (406) by the callee service processor application the library function call, including retrieving return data from the library function call. The method of FIG. 8 also includes returning (408), by the callee service processor application to the event manager, an event representing the return data from the library function call. Executing the library function call by the callee service processor application, including retrieving return data from the library function call, as well as returning an event representing the return data from the library function call by the callee service processor application to the event manager both can be carried out, for example, by a library call dispatcher operating as a separate thread of execution in the callee service processor application as described in more detail both above in this specification and below with reference to FIG. 12.

For further explanation, FIG. 9 sets forth a flow chart illustrating an exemplary method of passing, by the caller service processor application through the caller service processor application's API to the event manager, an event representing a library function call. The method of FIG. 9 is in effect an example of a method of operation for an event handling function (306 on FIGS. 4, 5, and 7) of a caller service processor application (302 on FIGS. 1, 4, 5, and 7). The method of FIG. 9 includes receiving (412) through the caller service processor application's API (304) a function call (411) to an event handling function. The function call (411) passes call data (413) as call parameters, and the called event handling function has the same signature as its corresponding direct API call to a data processing function of the library, func1(parm 1, parm2, . . . ), func2(parm 1, parm2, . . . ), or func2(parm 1, parm2, . . . ), and so on, where parm1, parm2, . . . are call parameters carrying call data. The method of FIG. 9 also includes constructing (414), by the called event handling function (306) with the call data (413) from the call parameters, an event (306) representing the library function call. The event may be represented as a message for transmission through an event manager object (324 on FIG. 5) and an IPC socket (330 on FIG. 5) to an event server daemon (326 on FIG. 5).

The method of FIG. 9 also includes calling (416) the event manager by the called event handling function (306), passing to the event manager as a call parameter the event representing the library function call. Passing the event representing the library function call to the event manager is described in detail both above in this specification and below with reference to FIG. 10. The call to the event manager eventually results in receipt in the event handling function (306) of an event (310) representing return data from the library function call. The method of FIG. 9 also includes receiving (418) the event (310) representing return data from the library function call, extracting the return data from the event representing the return data, and returning the return data to the calling routine (320) of the caller service processor application.

For further explanation, FIG. 10 sets forth a flow chart illustrating a further exemplary method of passing, by the caller service processor application through the caller service processor application's API to the event manager, an event representing a library function call. The method of FIG. 10 is in effect an example of a method of operation for a caller interface function (366 on FIG. 10), that carries out on behalf of an event handling function the low-level work of actual communications with an event manager. The example of FIG. 10 differs somewhat from the example of FIG. 9. In the method of FIG. 9, it is the event handling function that receives the call data and creates an event representing a library function call. In the example of FIG. 10, however, unlike the example of FIG. 9, it is the caller interface function that receives the call data from an event handling function and creates the event representing the library function call.

In the example of FIG. 10, a caller interface function (366) instantiates (420) an event manager object. The event manager object is an object of an event manager class that implements an interface like the one illustrated and described above with regard to reference (303) on FIG. 6, with a subscribe( ) method, an unsubscribe( ) method, a signal( ) method, a monitor( ) method, and so on. The caller interface function then subscribes through the event manager object to an event representing return data from a library function call, by, for example, a call such as this:

eventManager.subscribe(libraryFunctionName, Event_id_library_call_return, subscriber_ID), to the subscribe( ) method in the event manager, identifying the library function name for which the calling interface function wishes to subscribe for a return event, specifying that it is a library_call_return event to which the caller interface function is subscribing, and providing a subscriber identification "subscriber_ID" for the caller interface function. The subscribe( ) function registers the caller interface function as a subscriber for return events from the identified library function.

When the caller interface function receives (426), from an event handling function of a caller service processor application, call data for a library function call, the caller interface function creates (428) an event representing the library function call, including as parameters the name of the library function, call data for the library function's call parameters, and a unique identification code for the event representing the library function call. The caller interface function then passes (430) the event representing the library function call through the event manager object to the callee service processor application—by, for example, a call such as:

eventManager.signal(libraryFunctionName, Event_id_library_call, parm1, parm2, . . . ), where signal( ) is a member method of the event manager object that receives events and passes the events along through an IPC socket to an event server daemon. LibraryFunctionName is the name of the data processing function (316) to be called in the library (318). Event_id_library_call (352) is a unique identifier coupled with libraryFunctionName is used to inform the event server daemon that this is for a particular event representing a particular library function call. Parm1, parm2, . . . represent the call parameters for the library function call.

The caller interface function then monitors (432) the event manager to wait for an event representing return data from the library function call—by, for example, a call such as:

eventManager.monitor(returnData, Event_id_library_call_return), advising the event manager that the caller interface function is waiting for an event representing return data from a particular library function call identified by the Event_id_library_call return (354). When a return event occurs (434), advised by a return of the monitor( ) call, and the return event's returnData is determined to be a match (436) for an event representing a library function call earlier passed to the event manager, the caller interface function retrieves (438) return data from the event representing return data and returns the return data to the calling event handling function. It is the responsibility of the event handling function to further return the return data to a calling routine in a caller service processor application.

For further explanation, FIG. 11 sets forth a flow chart illustrating an example method of operation for an event server daemon component of an event manager. The method of FIG. 11 effects passing by the event manager (311) to the callee service processor application (312) the event representing a library function call by listening (502) on an IPC socket (330) for an event representing a library function call. Upon receiving (504) from a caller service processor application (302) an event representing a library function call, the event manager (311) determines (506) through its event server daemon (326) component whether a callee service processor application (302) is a subscriber to the event representing a library function call. The event server daemon makes this determination by looking up the name (514) of the called library function in the event-subscriber table (512) and finding (or not finding) a record in the table identifying a subscriber (516) for the called library function. If a callee service processor application (312) is a subscriber to the event representing a library function call, the event server daemon (326) sends (510) the event representing a library function call from the event manager to the callee service processor application through an IPC socket (332) established for this purpose.

The method of FIG. 11 also effects passing by the event manager (311) to the caller service processor application (302) an event representing return data from a library function call by listening (502) on an IPC socket (332) for an event representing return data from a library function call. Upon receiving (504) from a callee service processor application (312) an event representing return data from a library function call, the event manager (311) determines (506) through its event server daemon (326) component whether a caller service processor application (302) is a subscriber to the event representing return data from a library function call. The event server daemon makes this determination by looking up the name (514) of the called library function in the event-subscriber table (512) and finding (or not finding) a record in the table identifying a subscriber (516) for an event representing return data from a called library function. If a caller service processor application (302) is a subscriber to the event representing return data from a library function call, the event server daemon (326) sends (510) the event representing return data from a library function call from the event manager (311) to the caller service processor application (302) through an IPC socket (330) established for this purpose.

For further explanation, FIG. 12 sets forth a flow chart illustrating an exemplary method of executing by a callee service processor application the represented library function call, including retrieving return data from the library function and returning by the callee service processor application to the event manager an event representing the return data from the library function call. The 'represented library function call' is the library function call that is represented by an event representing a library function call. The method of FIG. 12 is, in effect, an example of a method of operation for a library call dispatcher (336 on FIG. 5) of a callee service processor application.

The method of FIG. 12 includes instantiating (602) an event manager object. A library call dispatcher instantiates an event manager object to gain access to the event management interface described above with regard to reference (303) on FIG. 6. The library call dispatcher then subscribes through the event manager object to an event representing a library function call—by, for example, a call such as:

eventManager.subscribe(libraryFunctionName, subscriber_ID), where subscribe( ) is the name of a member method of the event manager object that registers subscriptions to events. The library call dispatcher then monitors (608) the event manager object to wait for an event representing the library function call—by, for example, a call such as:

eventManager.monitor( . . . ), advising the event manager that the library call dispatcher is waiting to receive an event representing a library function call. When the library call dispatcher receives (610) an event representing a library function call, the library call dispatcher retrieves (612) event data from the event representing a library function call, including a unique identifier of the event representing a library function call. The library call dispatcher then identifies (614) from the event data which library function is to be called, that is, which library function call is represented by the event representing a library function call.

The library call dispatcher (336 on FIG. 5), which, remember, is a component of a callee service processor application (312 on FIG. 5), then calls (616) the represented library function (316 on FIG. 5) directly through the API (314 on FIG. 5) of direct calls exposed within the callee service processor application. The library call dispatcher then accepts (618) in the callee service processor application return data (340 on FIG. 5) from the call to the represented library function. The library call dispatcher then constructs (620), as a component of the callee service processor application, with the return data from the call to the represented library function, an event representing the return data from the library function call. The library call dispatcher, operating as a component of a callee service processor application, then calls (622) the event manager, passing to the event manager as a call parameter the event representing the return data from the library function call.

In view of the explanations set forth above, readers will recognize that the benefits of using an event manager to effect a library function call according to embodiments of the present invention include:

saving computer resources by implementing an extremely thin, event-handling API for applications calling the shared library functions, and maintaining synchronization of data administered by the shared library functions across calls from multiple calling applications.

Exemplary embodiments of the present invention are described largely in the context of a fully functional computer system for using an event manager to effect a library function call. Readers of skill in the art will recognize, however, that the present invention also may be embodied in a computer program product disposed on signal bearing media for use with any suitable data processing system. Such signal bearing media may be transmission media or storage media for machine-readable information, including magnetic media, optical media, or other suitable media. Examples of storage media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    passing, by a caller service processor application to an event manager, a first event representing a library function call,
        wherein the caller service processor application, the event manager, and a callee service processor application are executing on a service processor,
        wherein the first event is passed to the event manager via a first application programming interface of the caller service processor application,
        wherein a library function that corresponds to the library function call is directly accessible by the callee service processor application via a second application programming interface of the callee service processor application,
        wherein said passing the first event representing the library function call comprises,
            the caller processor application calling an event handling function defined in the first application programming interface,
        wherein the event handling function has a same signature as the library function,
        wherein said calling the event handling function comprises passing call data as call parameters for the event handling function,
        constructing the first event with the call data and a function name of the event handling function (could be the event handling function or a caller interface fxn called by the event handling fxn);
    passing, by the event manager to the callee service processor application, the first event representing the library function call;
    executing, by the callee service processor application, the library function call based on the first event, wherein said executing the library function call yields return data;
    returning, by the callee service processor application to the event manager, a second event representing the return data; and
    returning, by the event manager to the caller service processor application, the second event representing the return data.

2. The method of claim 1, wherein passing, by the event manager to the callee service processor application, the first event representing the library function call comprises:
    an event server daemon, which is a component of the event manager, sending the first event through an inter-process communication socket to an event manager object previously instantiated by a library call dispatcher of the callee service processor application
    wherein the library call dispatcher previously subscribed events with the function name using the event manager object instantiated by the library call dispatcher.

3. The method of claim 1 wherein said passing, by the event manager to the callee service processor application, the first event representing the library function call comprises:
    determining, by the event manager, that the callee service processor application is a subscriber to the first event representing the library function call based, at least in part, on the call data and the function name of the first event.

4. The method of claim 1 wherein executing, by the callee service processor application, the represented library function call based on the first event comprises:
    calling, by the callee service processor application, the represented library function through the second application programming interface.

5. The method of claim 1 further comprising:
    a library call dispatcher, which is a component of the callee service processor application, constructing the second event with the return data from and with an identifier of the first event; and
    wherein said returning the second event to the event manager comprises the library call dispatcher calling the event manager and passing the second event as a call parameter.

6. The method of claim 5 further comprising:
    determining, by the event manager, that the caller service processor application is a subscriber to the second event based on the identifier, in response to receiving the second event.

7. An apparatus for comprising:
    a computer processor, a computer memory operatively coupled to the computer processor, the computer memory having disposed within it computer program instructions capable of:

passing, by a caller service processor application to an event manager, a first event representing a library function call,
    wherein the caller service processor application, the event manager, and a callee service processor application are executing on a service processor,
    wherein the first event is passed to the event manager via a first application programming interface of the caller service processor application,
    wherein a library function that corresponds to the library function call is directly accessible by the callee service processor application via a second application programming interface of the callee service processor application,
    wherein said passing the first event representing the library function call comprises,
        the caller processor application calling an event handling function defined in the first application programming interface,
        wherein the event handling function has a same signature as the library function,
        wherein said calling the event handling function comprises passing call data as call parameters for the event handling function,
        constructing the first event with the call data and a function name of the event handling function (could be the event handling function or a caller interface fxn called by the event handling fxn);
passing, by the event manager to the callee service processor application, the first event representing the library function call;
executing, by the callee service processor application, the library function call based on the first event, wherein said executing the library function call yields return data;
returning, by the callee service processor application to the event manager, a second event representing the return data; and
returning, by the event manager to the caller service processor application, the second event representing the return data.

8. The apparatus of claim 7, wherein the computer program instructions being capable of passing, by the event manager to the callee service processor application, the first event representing the library function call comprises:
    an event server daemon, which is a component of the event manager, sending the first event through an inter-process communication socket to an event manager object previously instantiated by a library call dispatcher of the callee service processor application
    wherein the library call dispatcher previously subscribed events with the function name using the event manager object instantiated by the library call dispatcher.

9. The apparatus of claim 7 wherein the computer program instructions being capable of passing, by the event manager to the callee service processor application, the first event representing the library function call comprises:
    determining, by the event manager, that the callee service processor application is a subscriber to the first event representing the library function call based, at least in part, on the call data and the function name of the first event.

10. The apparatus of claim 7 wherein the computer program instructions being capable of executing, by the callee service processor application, the represented library function call based on the first event comprises:
    calling, by the callee service processor application, the represented library function through the second application programming interface.

11. The apparatus of claim 7, wherein the computer program instructions comprise instructions for a library call dispatcher:
    wherein the instructions for the library call dispatcher, which is a component of the callee service processor application, are capable of constructing the second event with the return data from and with an identifier of the first event; and
    wherein said returning the second event to the event manager comprises the library call dispatcher calling the event manager and passing the second event as a call parameter.

12. The apparatus of claim 11 function call further comprising the computer program instructions being capable of:
    determining, by the event manager, that the caller service processor application is a subscriber to the second event based on the identifier, in response to receiving the second event.

13. A computer program product for using an event manager to effect a library function call from a caller service processor, the computer program product disposed in a machine-readable storage medium, the computer program product comprising computer program instructions capable of:
    passing, by a caller service processor application to an event manager, a first event representing a library function call,
        wherein the caller service processor application, the event manager, and a callee service processor application are executing on a service processor,
        wherein the first event is passed to the event manager via a first application programming interface of the caller service processor application,
        wherein a library function that corresponds to the library function call is directly accessible by the callee service processor application via a second application programming interface of the callee service processor application,
        wherein said passing the first event representing the library function call comprises,
            the caller processor application calling an event handling function defined in the first application programming interface,
            wherein the event handling function has a same signature as the library function,
            wherein said calling the event handling function comprises passing call data as call parameters for the event handling function,
    constructing the first event with the call data and a function name of the event handling function ( );
passing, by the event manager to the callee service processor application, the first event representing the library function call;
executing, by the callee service processor application, the library function call based on the first event, wherein said executing the library function call yields return data;
returning, by the callee service processor application to the event manager, a second event representing the return data; and
returning, by the event manager to the caller service processor application, the second event representing the return data.

14. The computer program product of claim 13 wherein the computer program instructions being capable of passing, by the event manager to the callee service processor application, the first event representing the library function call comprises the computer program instructions being capable of:

an event server daemon, which is a component of the event manager, sending the first event through an inter-process communication socket to an event manager object previously instantiated by a library call dispatcher of the callee service processor application wherein the library call dispatcher previously subscribed events with the function name using the event manager object instantiated by the library call dispatcher.

15. The computer program product of claim 13 wherein the computer program instructions being capable of passing, by the event manager to the callee service processor application, the first event representing the library function call comprises computer program instructions capable of:

determining, by the event manager, that the callee service processor application is a subscriber to the first event representing the library function call based, at least in part, on the call data and the function name of the first event.

16. The computer program product of claim 13 wherein the computer program instructions being capable of executing, by the callee service processor application, the represented library function call based on the first event comprises computer program instructions capable of:

calling, by the callee service processor application, the represented library function through the second application programming interface.

17. The computer program product of claim 13, wherein the computer program instructions comprise instructions for a library call dispatcher:

wherein the instructions for the library call dispatcher, which is a component of the callee service processor application, are capable of constructing the second event with the return data from and with an identifier of the first event; and wherein said returning the second event to the event manager comprises the library call dispatcher calling the event manager and passing the second event as a call parameter.

18. The computer program product of claim 17 further comprising computer program instructions capable of:

determining, by the event manager, that the caller service processor application is a subscriber to the second event based on the identifier, in response to receiving the second event.

* * * * *